Oct. 4, 1932. I. M. FREEMAN 1,881,073
FAIRING DEVICE
Filed June 22, 1931
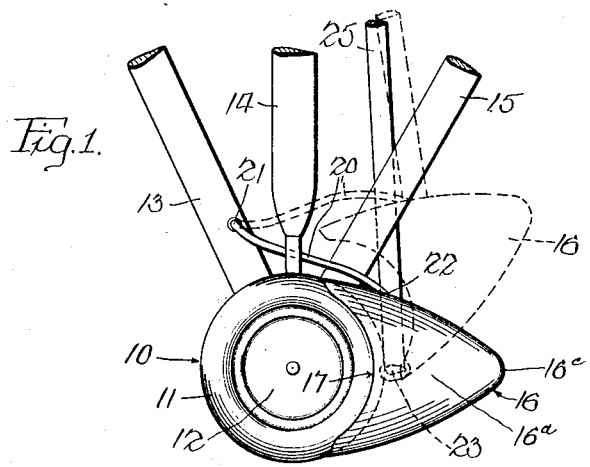
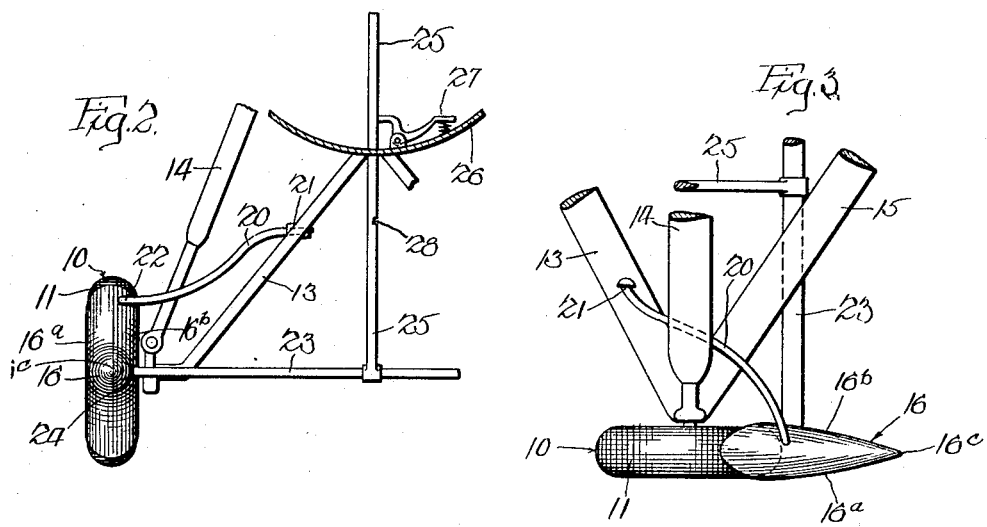
Inventor
Ira M. Freeman
By Luther Johns
Atty.

Patented Oct. 4, 1932

1,881,073

UNITED STATES PATENT OFFICE

IRA M. FREEMAN, OF CHICAGO, ILLINOIS

FAIRING DEVICE

Application filed June 22, 1931. Serial No. 545,927.

These improvements relate to fairings for the landing wheels of aircraft. The object of fairings in general is to reduce the parasitic wind drag upon the object to which the fairing is applied. Such wind drag is ordinarily contemplated as part of the resistance.

The prime object of the present invention is to provide a greater freedom of forward motion in flight, thereby increasing the efficiency of the aircraft, through the lowering of the parasitic drag upon the wheels of the landing gear. I may mention that owing to the poor aerodynamic shape of the landing gear wheels, which usually have a large rim in the form of an inflated tire, the high resistance of the wheels alone may consume as much as seven percent of the engine power when the machine is travelling at high speed. The principal air-resistance power loss from the landing gear at the present time is due to the resistance of the wheels since such structures as struts and ties are being formed with stream-line effects greatly reducing their resistance to forward travel.

The several methods heretofore suggested for modifying favorably the air resistance of the wheels include covering the spokes by smooth circular discs extending to the rims, which has the effect of rendering the wheel as a whole a solid body and avoids considerable air-current drag. I preferably employ such coverings, or a disc-type of wheel, in my improved means for reducing the air resistance.

Another prior suggestion is a cover or cap, frequently called "wheel pants", substantially covering the wheel and leaving only the bottom portion of the tire projecting. While such caps are given stream-line effects they constitute an object at the wheels of greater size than the wheel itself, with consequently greater air resistance; and, furthermore, being open at the bottom the parasitic drag is very pronounced at and around the lower edges of the device.

A third prior suggestion has been to draw the landing gear up into the fuselage, or folding it into special recesses in the lower surfaces of the adjacent wing. These plans have various objections. For examples, the operator may neglect to lower the landing gear; and such constructions usually involve considerable mechanism, adding weight and calling for appreciable effort in their operation.

Among the specific objects of the present invention are the provision of such advantages as providing what is probably the least resistance obtainable for wheels of the kind employed on aircraft today; the avoidance of all but probably the minimum added weight; the capacity for attachment to aircraft now in use; the movability of the fairing into a position entirely out of the way, and by slight effort, at the time of landing or taking off; the provision of fairing which, should the operator fail to move same into the out-of-the-way position, would still enable a landing to be made without serious, if any, bad results; the avoidance of a large body at the wheels, or, stated otherwise, providing fairing which does not itself add to the resistance; the provision of fairing which does not interfere with the normal operations of removing and replacing wheels, tires, bearings, etc., permits full inspection, and, in short, admits of all desirable access to the wheels and associated parts; providing a fairing which does not interfere with the "toeing-in" and camber of the wheels in landing and the adjustment of the wheels to their flight position after taking off; providing a fairing device and control parts for same easily to be operated; and to provide a mechanism as a whole of relatively light weight. Those skilled in the art will appreciate other incidental advantages; but the foregoing are believed sufficient to indicate that in addition to the advantages of simplicity, highly important functional results are attained.

In the drawing Figure 1 shows in side elevation the device as applied to an airplane landing wheel with wheel supports fragmentarily shown;

Fig. 2 is a fragmentary rear elevation showing the mechanism applied as in Fig. 1, with fuselage parts fragmentarily shown in section; and Fig. 3 is a top elevation of the parts shown in Fig. 1.

The wheel marked as a whole 10 has a rubber tire 11, a central disc, or a wheel covering, 12, and supporting struts 13, 14 and 15, these parts numbered 12 to 15 inclusive being old and well-known. The device may be applied to landing gears of other constructions.

The fairing device body marked as a whole 16 will preferably be formed of thin sheet metal, but other materials may be used. It is preferably a hollow body, weight being always a factor, and is adapted to fit snugly upon the posterior peripheral surface of the tire 11, which I shall denominate broadly the rim of the wheel, from a place near the top of the wheel to a place near the bottom thereof, the side walls 16a and 16b of the body 16 fitting upon the tire or rim and therefore being formed substantially circularly at the front edges marked 17, these edge lines being the same on both sides and merging into each other at top and bottom. The body may be made of two similarly formed parts secured together along their top and bottom edges.

The fairing body thus encompasses the peripheral portions of the tire or rim substantially over all thereof having a rearward projection. The open front end of the fairing is preferably shaped to conform to the wheel so well that this overlapping connection constitutes a substantially snug fit.

The better the fit the better the results. The edges of the fairing body at the wheel do not project laterally beyond the side planes of the tire.

Fig. 3 shows that the fairing has almost the width of the tire where it meets the tire. From this place the fairing extends rearward, the sides, top and bottom being formed substantially in accordance with the streamlines of the air caused by the front edge of the wheel in its forward movement. This brings the rear end of the fairing at 16c to a small-area termination, the sides coming together closely at this place and the top and bottom edges tapering toward each other and all edge portions being rounded.

The fairing body 16 is supported for rocking movements by a swinging arm 20 pivotally mounted at 21 in one of the struts as 13, this arm being rigidly secured to the fairing at 22. A horizontal power-transmitting rod 23 is also secured to the fairing, as at 24, and a lifting rod 25 extends upward therefrom. This operating rod 25 leads to within the cockpit structure 26 (Fig. 2) or some other appropriate part of the fuselage whereby the operator or someone else may pull upon rod 25 and thereby lift the fairing body 16 into its dotted-line position in Fig. 1, where it is entirely clear of the wheels. A spring-pressed dog 27 adapted to engage notch 28 in rod 25 holds the fairing in raised position.

After taking off the operator simply lowers rod 25, carrying the fairing downward into the full-line position shown in all of the figures.

It will be understood that rod 23 extends to the opposite side of the landing gear and that pull rod 25 is midway between the two fairing devices and operates both at the same time.

The swinging arm 20 serves partly as a guide and partly as a strut. Rod 23 serves as a fixed brace or distancer between the two fairings as 16 and the oppositely-disposed rods as 20 (only one being shown) maintain each fairing body 16 at a given relative distance outward from its associated bearing 21. We therefore have a braced structure according to which the fairing may be raised and lowered at will, always coming down to the proper position upon the wheel.

Landing gears are sometimes constructed so as to have the camber of the wheels change when the weight of the airplane is off the landing gear. The present fairing can be adjusted to conform to the flight position of the wheels, since the fairing is out of the way during landing and taking off.

Should the operator neglect to withdraw the fairing from the wheel on landing no serious mishap will occur. Assuming friction at the top of the fairing, the friction is that of surfaces substantially parallel to each other, and there is free sliding of the wheel under the fairing. The friction of at least three-fourths of the contact areas from the bottom upward tends to raise the fairing. In practice, then, the fairing merely vibrates or chatters upon the wheel if not raised for the landing.

The device as a whole is exceedingly simple, of few parts, of light weight and provides the various advantages hereinabove pointed out.

I contemplate as being included in these improvements all such changes, variations and departures from what is thus specifically illustrated and described as fall within the scope of the appended claims.

I claim:

1. The combination with an aircraft landing wheel having a rim, of a hollow fairing body formed of sheet material having its front end shaped to conform substantially to the shape of the outer periphery of the wheel rim through a large part of its extent not substantially more than one hundred and eighty degrees, the body extending inward along the sides of the rim, and being approximately of the width of the rim at that part of the body which fits upon the rim, said body fitting upon the posterior portion of the rim from near the top along the sides to near the bottom thereof, extending rearward therefrom, and tapering rearward with streamline characteristics, means pivoted a substantially great distance from the axis of the wheel for holding said body readily removably in said position, and manually-controlled means for moving said body out of said position.

2. The combination with an aircraft landing wheel having a rim, of a fairing body substantially closely fitting upon the posterior portion of the rim from near the top to near the bottom thereof, extending rearward therefrom, and tapering rearward with stream-line characteristics, a pivoted member extending to a place a substantially great distance from the axis of the wheel for holding said body in operative position, and means under the control of the operator for swinging said body out of said position on said pivoted member.

3. A fairing body for application to an aircraft landing wheel comprising a pair of similarly-shaped light-weight sheet-metal parts secured together at their edges and forming a hollow body normally extending rearward from the wheel with stream-line characteristics and with the front edges of the body formed on curved lines to fit snugly upon the rear periphery of the rim of the wheel at top and bottom of the body and along the sides of the wheel rim from approximately the top to approximately the bottom thereof.

4. The combination with an aircraft having a landing wheel, of a fairing body adapted to encompass rear portions of the rim of the wheel and extending rearward therefrom, and means secured to the fairing body and pivotally mounted on an axis at a relatively fixed portion of the aircraft structure remote from the wheel for holding the fairing body for swinging movements on said axis into and out of its operative position in close association with the wheel.

IRA M. FREEMAN.